United States Patent
Tsai et al.

(10) Patent No.: US 8,220,009 B2
(45) Date of Patent: Jul. 10, 2012

(54) PROTECTION DEVICE OF SLOT-IN OPTICAL DISK DRIVE

(75) Inventors: Yao-Ching Tsai, Taoyuan County (TW); Jen-Chen Wu, Taoyuan County (TW)

(73) Assignee: Quanta Storage Inc., Taoyuan County (TW)

( * ) Notice: Subject to any disclaimer, the term of this patent is extended or adjusted under 35 U.S.C. 154(b) by 240 days.

(21) Appl. No.: 12/773,543

(22) Filed: May 4, 2010

(65) Prior Publication Data
US 2010/0281495 A1 Nov. 4, 2010

(30) Foreign Application Priority Data
May 4, 2009 (TW) ................................ 98114885 A

(51) Int. Cl.
*G11B 17/04* (2006.01)

(52) U.S. Cl. ........................................................ 720/619

(58) Field of Classification Search ............... 360/130.2, 360/130.31
See application file for complete search history.

(56) References Cited

U.S. PATENT DOCUMENTS

| 4,739,421 A * | 4/1988 | Narasawa ........................ 360/85 |
| 6,342,988 B1 * | 1/2002 | Matsuoka et al. ............... 360/95 |

FOREIGN PATENT DOCUMENTS
JP 07180719 A * 7/1995
* cited by examiner

*Primary Examiner* — Brian Miller
(74) *Attorney, Agent, or Firm* — Rabin & Berdo, P.C.

(57) ABSTRACT

A protection device of a slot-in optical disk drive is provided. The protection device is disposed between two linking parts of the slot-in optical disk drive. One of the two linking parts is formed with a slot, and the other one of the two linking parts is connected to an upper end of a guide pin. A lower end of the guide pin protrudes and is inserted into the slot, and a portion of the guide pin corresponding to a side of the slot is formed with a notch. As the notch engages with the slot, the situation that the guide pin slides out of the slot can be avoided.

8 Claims, 3 Drawing Sheets

PROTECTION DEVICE OF SLOT-IN OPTICAL DISK DRIVE

This application claims the benefit of Taiwan application Serial No. 98114885, filed May 4, 2009, the subject matter of which is incorporated herein by reference.

BACKGROUND OF THE INVENTION

1. Field of the Invention

The invention relates in general to a slot-in optical disk drive, and more particularly to a protection device of a slot-in optical disk drive which prevents a driving member of a disc loading/unloading mechanism from sliding out.

2. Description of the Related Art

In a slot-in optical disk drive, an optical disc is automatically loaded to a play position or unloaded through several guide rods of a disc loading/unloading mechanism linked by driving linking rods. As the operation of the slot-in optical disk drive is simple and the slot-in optical disk drive is thinned easily, the slot-in disk drive has become a mainstream product in the market.

As shown in FIG. 1, a way for driving a guide rod in a traditional slot-in disk drive is shown. In the traditional slot-in disk drive, each linked guide rod 1 is formed with a guide pin 2 or a slot 3. As the slot 3 is swayed up/down or right/left, the guide pin 2 inserted into the slot 3 slides along the edge of the slot 3 and moves each guide rod 1 to contact the peripheral of the optical disc so as to guide the optical disc to be loaded or unloaded according to the loading/unloading state of the optical disc.

However, in order to reduce the height of the slot-in optical disk drive, the height of the guide pin 2 and the height of the slot 3 are both reduced. Due to the limited space, no strengthening structure can be added. Therefore, the guide pin 2, which should only slide in the shallow slot 3, may easily slide out of the slot 3, as indicated by the dotted line 2', so that the slot-in optical disk drive may be jammed or damaged easily. Besides, due to the assembly tolerance, the components of the slot-in optical disk drive may have different frictional resistances after assembly. If the driving force of the slot-in optical disk drive is adjusted to be too small, the force applied to the guide pin 2 by the slot 3 is reduced to avoid the guide pin 2 sliding out of the slot 3. However, the optical disc cannot be loaded or unloaded smoothly as the driving force is not enough. If the driving force is increased, the force applied to the guide pin 2 by the slot 3 is increased so as to make the guide pin 2 slide out of the slot 3 easily. Therefore, the adjustment of the driving force is difficult, and more manufacturing time is needed. Moreover, abnormal use, such as the optical disc being held or released too late, also makes the guide pin 2 with the smooth sides move out of the slot 3 easily. Thus, the driving structure of the guide rod of the conventional slot-in optical disk drive still has many problems to resolve.

SUMMARY OF THE INVENTION

According to a first aspect of the present invention, a protection device of a slot-in optical disk drive is provided. Through a cylindrical surface of a guide pin formed with a notch, a slot of the slot-in optical disk drive is engaged, so that the situation that the guide pin slides out of the slot can be prevented.

According to a second aspect of the present invention, a protection device of a slot-in optical disk drive is provided. Through the slope difference between a top bevel and a bottom bevel of a notch of a guide pin, the guide pin is difficult to slide out of a slot and easy to resume the normal function.

According to a third aspect of the present invention, a protection device of a slot-in optical disk drive is provided. A notch of a guide pin is annular to facilitate the fabrication of the notch.

To have the above features, a protection device of a slot-in optical disk drive according to the present invention is disposed between two linking parts of the slot-in optical disk drive. One of the two linking parts is formed with a slot, and the other one of the two linking parts is connected to an upper end of the guide pin. The guide pin is a pillar. A lower end of the guide pin protrudes and is inserted into the slot. A portion of the guide pin corresponding to a side of the slot is formed a notch. As the notch engages with the slot, the situation that the guide pin slides out of the slot can be avoided.

According to the protection device of the present invention, two notches are formed at the portion of the guide pin corresponding to two sides of the slot, respectively. A surface of the notch is formed with a top bevel at the top and a bottom bevel at the bottom. As the slope of the top bevel is smaller than the slope of the bottom bevel, the guide pin would not slide out of the slot easily and resumes the normal function easily. The guide pin is a cylinder to facilitate the fabrication of an annular notch.

The invention will become apparent from the following detailed description of the preferred but non-limiting embodiments. The following description is made with reference to the accompanying drawings.

DETAILED DESCRIPTION OF THE INVENTION

The technologies adopted by the present invention to achieve the above features are disclosed in preferred embodiments below with accompanying drawings and elaboration.

Figure 1:
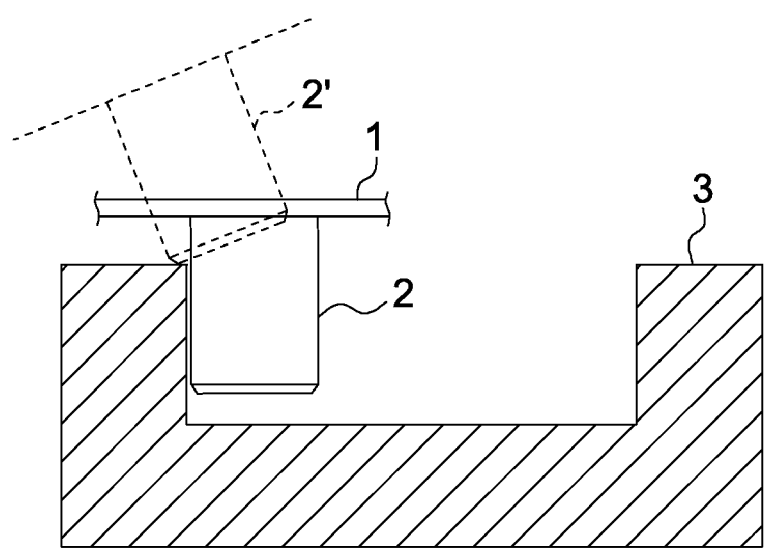
FIG. 1 shows a cross-sectional view of a traditional driving structure of a guide rod.
Figure 2:
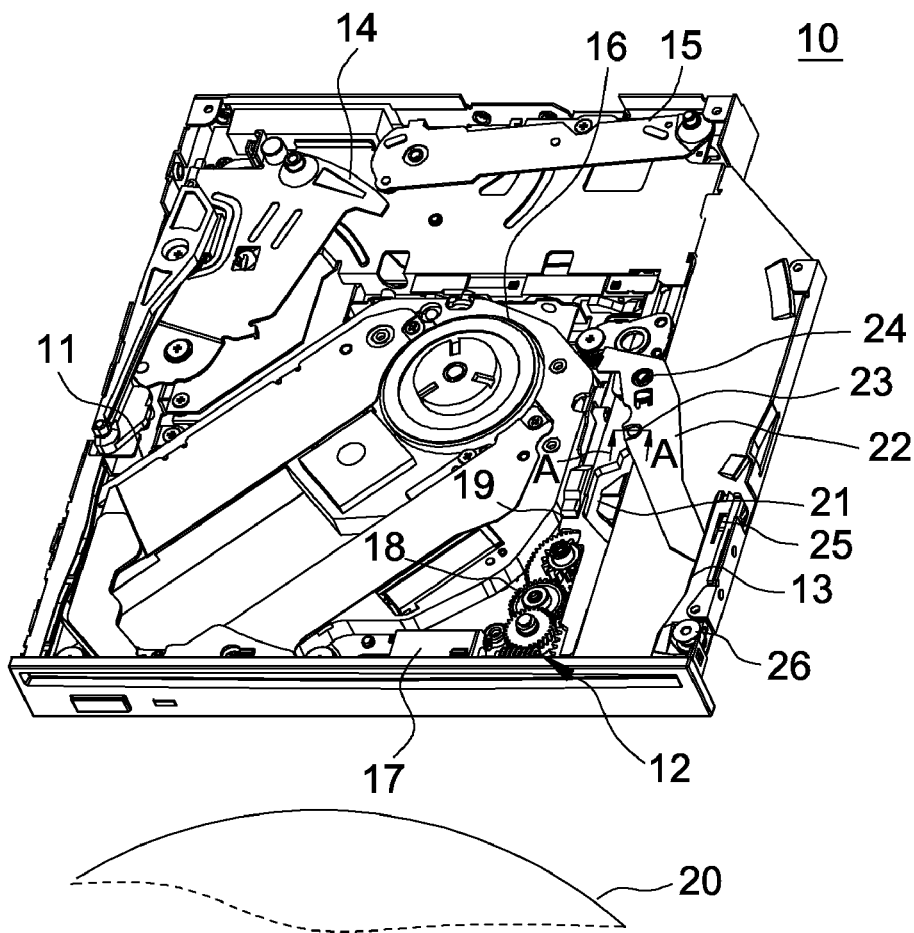
FIG. 2 shows a 3D view of a slot-in optical disk drive with a protection device according to the present invention.

Referring to FIG. 2, a 3D view of a slot-in optical disk drive 10 with a protection device according to the present invention is shown. The slot-in optical disk drive 10 includes a traverse 11, a power unit 12, a disc-loading guide rod 13, a disc-unloading guide rod 14 and a positioning guide rod 15. The traverse 11 is disposed in the hollow interior of the slot-in optical disk drive 10. A spindle motor 16 is disposed at one end of the traverse 11, and is located at the center of the slot-in optical disk drive 10. The power unit 12 is disposed near the traverse 11. The power unit 12 rotates a gear set 18 by a transmission motor 17 so as to drive a sliding member 19 to move forward and backward along a side of the slot-in optical disk drive 10. Through linking rods, the disc-loading guide rod 13, the disc-unloading guide rod 14 and the positioning guide rod 15 are driven to guide an optical disc 20 to be loaded into or unloaded from the slot-in optical disk drive 10.

The linking parts of the slot-in optical disk drive 10 including the traverse 11, the disc-loading guide rod 13, the disc-unloading guide rod 14, the positioning guide rod 15 and the sliding member 19 are linked and driven through a slot combined with a guide pin. Let the disc-loading guide rod 13 be taken as an example. The sliding member 19 and a driving rod 22 are two of the linking parts. A guide pin 23 of the driving rod 22 is inserted into a slot 21 of the sliding member 19. One end of the driving rod 22 is fixed on the slot-in optical disk drive 10 through a pivot 24, so that the driving rod 22 rotates around the pivot 24. The other end of the driving rod 22 is connected to the disc-loading guide rod 13. In addition, one end of the disc-loading guide rod 13 is fixed on one side of the slot-in optical disk drive 10 via a pivotal shaft 25, so that the disc-loading guide rod 13 rotates around the pivotal shaft 25. The other end of the disc-loading guide rod 13 extends to the entrance of the slot-in optical disk drive 10 to form a disc-receiving end 26. When the sliding member 19 is driven to move forward and backward, the guide pin 23 is moved along the curved slot 21, so that the driving rod 22 is rotated around the pivot 24, and the other end of the driving rod 22 drives the disc-loading guide rod 13 to move. The disc-loading guide rod 13 is rotated around the pivotal shaft 25 so as to move the disc-receiving end 26 to load the optical disc 20.

Figure 3:
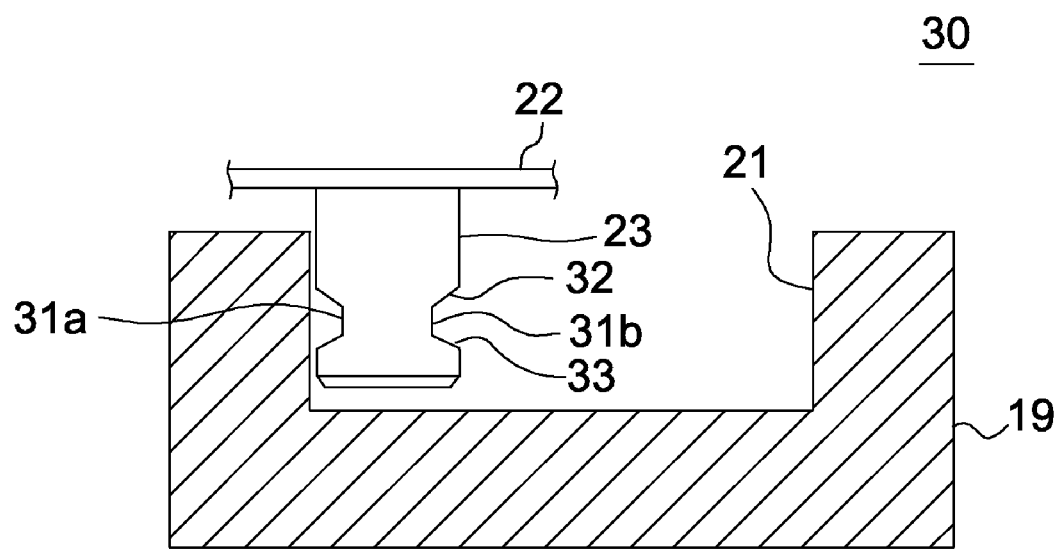
FIG. 3 shows a cross-sectional view of a protection device according to a first embodiment of the present invention.

Referring to FIG. 3, a cross-sectional view of a protection device 30 taken along line A-A in FIG. 2 with the engagement structure of the slot 21 and the guide pin 23 is shown. The guide pin 23 is a pillar, and can be a cylinder. An upper end of the guide pin 23 is connected to the underneath of the driving rod 22, and a lower end of the guide pin 23 protrudes and is inserted into the slot 21. The portions of the guide pin 23 corresponding to two sides of the slot 21 are from with two notches 31a and 31b, respectively. A surface of each notch 31a and 31b is formed with a top bevel 32 at the top and a bottom surface 33 at the bottom.

Figure 4:
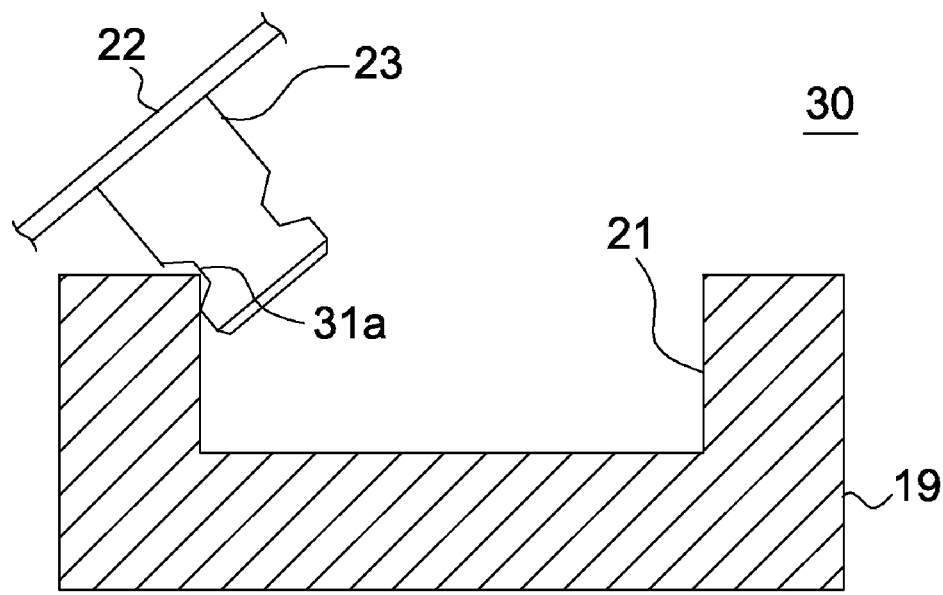
FIG. 4 shows the guide pin and a slot configuration according to the first embodiment of the present invention.

When the sliding member 19 is moved forwards or backwards, the slot 21 of the sliding member 19 is moved accordingly. When the slot 21 is moved forwards or backwards, one of the sides pushes the guide pin 23 to move along the slot 21. Referring to FIG. 4, the state showing the guide pin 23 of the protection device 30 sliding out of the slot 21 is shown. Once the disc-loading guide rod is resisted (for example, when the optical disc is held by a user, the disc-receiving end can not load the optical disc smoothly), the driving rod 22 halts so as to cause the guide pin 23 to resist the push made by the slot 21. The sheet-shaped driving rod 22 is deformed and shifted slightly to drive the sides of the guide pin 23 tilt and slide out along the edge of the slot 21, so that the edge of the slot 21 enters and engages the notch 31a. Therefore, the guide pin 23 can be prevented from sliding out of the slot 21 so as to maintain the connection between the driving rod 22 and the sliding member 19.

According to the protection device of the slot-in optical disk drive of the first embodiment of the present invention, by forming the notches at the cylindrical surface of the guide pin, the guide pin which slides out along the edge of the slot can be engaged with the notch to prevent from moving out of the slot. Therefore, the situation that the above components are jammed or damaged can be avoided so as to protect the slot-in optical disk drive.

Figure 5:
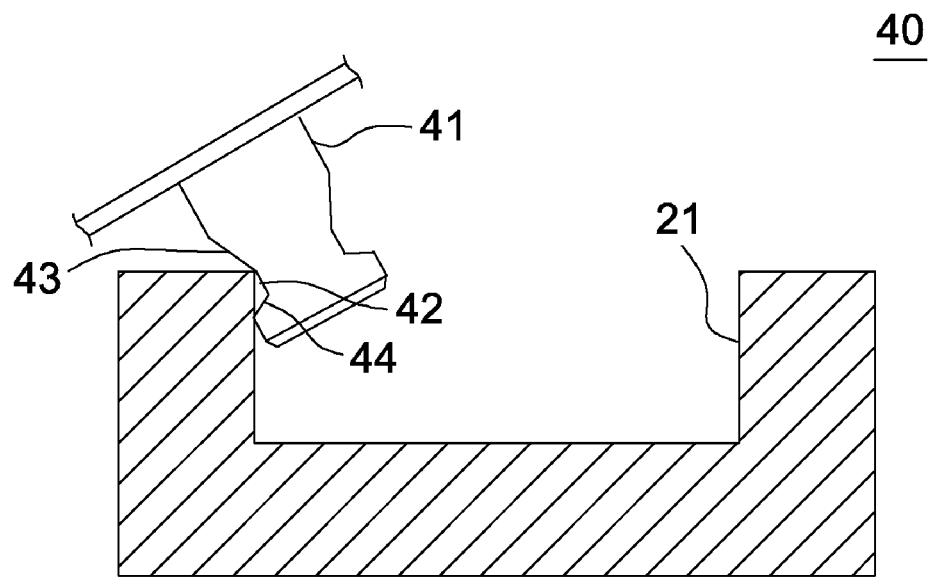
FIG. 5 shows a guide pin and a slot configuration according to a second embodiment of the present invention.

Referring to FIG. 5, the state showing the guide pin of the protection device 40 sliding out of a slot according to a second embodiment of the present invention is shown. The basic structural of the present embodiment is similar to that of the protection device 30 of the first embodiment. For illustration simplification purpose, the same designations are applied to the same components. The present embodiment of the invention differs from the first embodiment in that the slope of the top bevel 43 of the notch 42 of the guide pin 41 is smaller than the slope of the bottom bevel 44. When the guide pin 41 slides out of the slot 21, the edge of the slot 21 is guided by the top bevel 43 with the smaller slope so as to enter the notch 42 smoothly and is engaged by the bottom bevel 44 of the notch 42 with the larger slope so as to prevent the guide pin 41 from sliding out of the slot 21. When the resistance which impedes the disc-loading guide rod from pushing the optical disc disappears (for example, the user releases the optical disc), the guide pin 41, being pushed by the slot 21, moves back along the top bevel 43 with the smaller slope, and slides back easily to the normal state.

Thus, according to the protection device 40 of the second embodiment of the present invention, the edge of the slot can be smoothly guided to enter/leave the notch through the top bevel of the notch of the guide pin having the smaller slope, and the edge of the slot can be engaged by the bottom bevel having the larger slope, so that the guide pin would not easily slide out of the slot, and is easy to resume the normal state.

Figure 6:
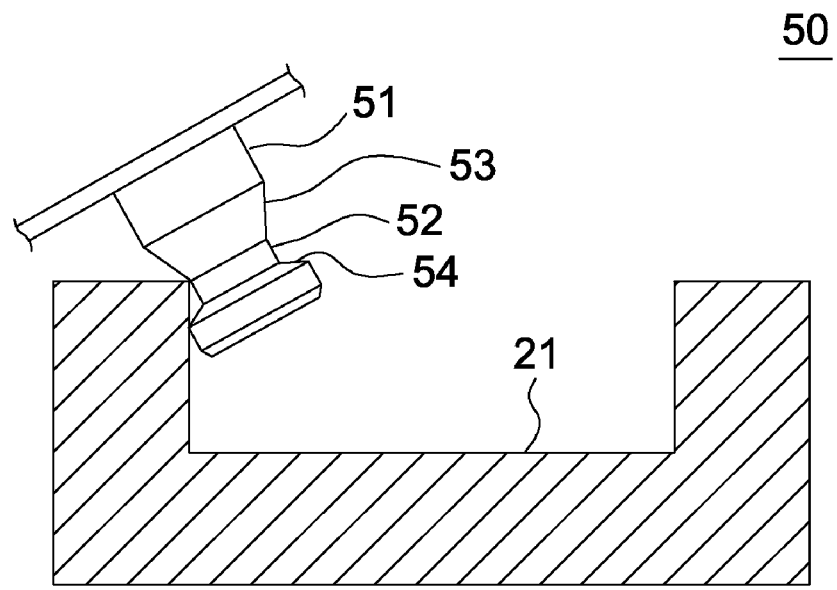
FIG. 6 shows a guide pin and a slot configuration according to a third embodiment of the present invention.

Referring to FIG. 6, the state showing the guide pin of the protection device 50 sliding out of a slot according to a third embodiment of the present invention is shown. The basic structural of the present embodiment is similar to the protection device 30 of the first embodiment. For illustration simplification purpose, the same designations are applied to the same components. The present embodiment of the invention differs from the first embodiment in that the notch 52 of the guide pin 51 is annular, and the slope of the annular top bevel 53 is smaller than that of the annular bottom bevel 54. The edge of the slot 21 is guided by the cylindrical top bevel 53 with the smaller slope to enter or leave the notch 52 easily, and is engaged by the bottom bevel 54 with the larger slope. According to the present embodiment of the invention, the notch of the guide pin is annular, so that the cylindrical guide pin is easily cut and shaped, hence making the manufacturing easy and lowering the cost.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A protection device of a slot-in optical disk drive, wherein the protection device is disposed between two linking parts of the slot-in optical disk drive, and the protection device comprises:
   a slot formed at a first of the two linking parts; and
   a guide pin disposed at a second of the two linking parts, wherein the guide pin is a pillar, an upper end of the guide pin is connected to the second linking part, a lower end of the guide pin protrudes and is inserted into the slot, and a portion of the guide pin, that corresponds to a first side of the slot, is formed with a notch.

2. The protection device of the slot-in optical disk drive according to claim 1, wherein the notch includes two notches that are formed at the portion of the guide pin, the portion corresponding to two sides, including the first side, of the slot.

3. The protection device of the slot-in optical disk drive according to claim 1, wherein a surface of the notch is formed with a top bevel and a bottom bevel.

4. The protection device of the slot-in optical disk drive according to claim 3, wherein a slope of the top bevel is smaller than a slope of the bottom bevel.

5. The protection device of the slot-in optical disk drive according to claim 1, wherein the guide pin is a cylinder.

6. The protection device of the slot-in optical disk drive according to claim 5, wherein the notch is annular.

7. The protection device of the slot-in optical disk drive according to claim 1, wherein the first linking part is a sliding member of the slot-in optical disk drive.

8. The protection device of the slot-in optical disk drive according to claim 7, wherein the second linking part is a driving rod of a disc-loading guide rod of the slot-in optical disk drive.

* * * * *